(No Model.) 3 Sheets—Sheet 1.

W. M. DRESSKELL.
ELECTRIC MOTOR.

No. 445,499. Patented Jan. 27, 1891.

WITNESSES:
W. R. Davis
C. Sedgwick

INVENTOR:
W. M. Dresskell

BY
ATTORNEYS

THE NORRIS PETERS CO., PHOTO-LITHO., WASHINGTON, D. C.

(No Model.) W. M. DRESSKELL. 3 Sheets—Sheet 2.
ELECTRIC MOTOR.

No. 445,499. Patented Jan. 27, 1891.

WITNESSES:
W. R. Davis.
C. Sedgwick

INVENTOR:
W. M. Dresskell
BY
Munn
ATTORNEYS (No Model.) 3 Sheets—Sheet 3.
W. M. DRESSKELL.
ELECTRIC MOTOR.
No. 445,499. Patented Jan. 27, 1891.
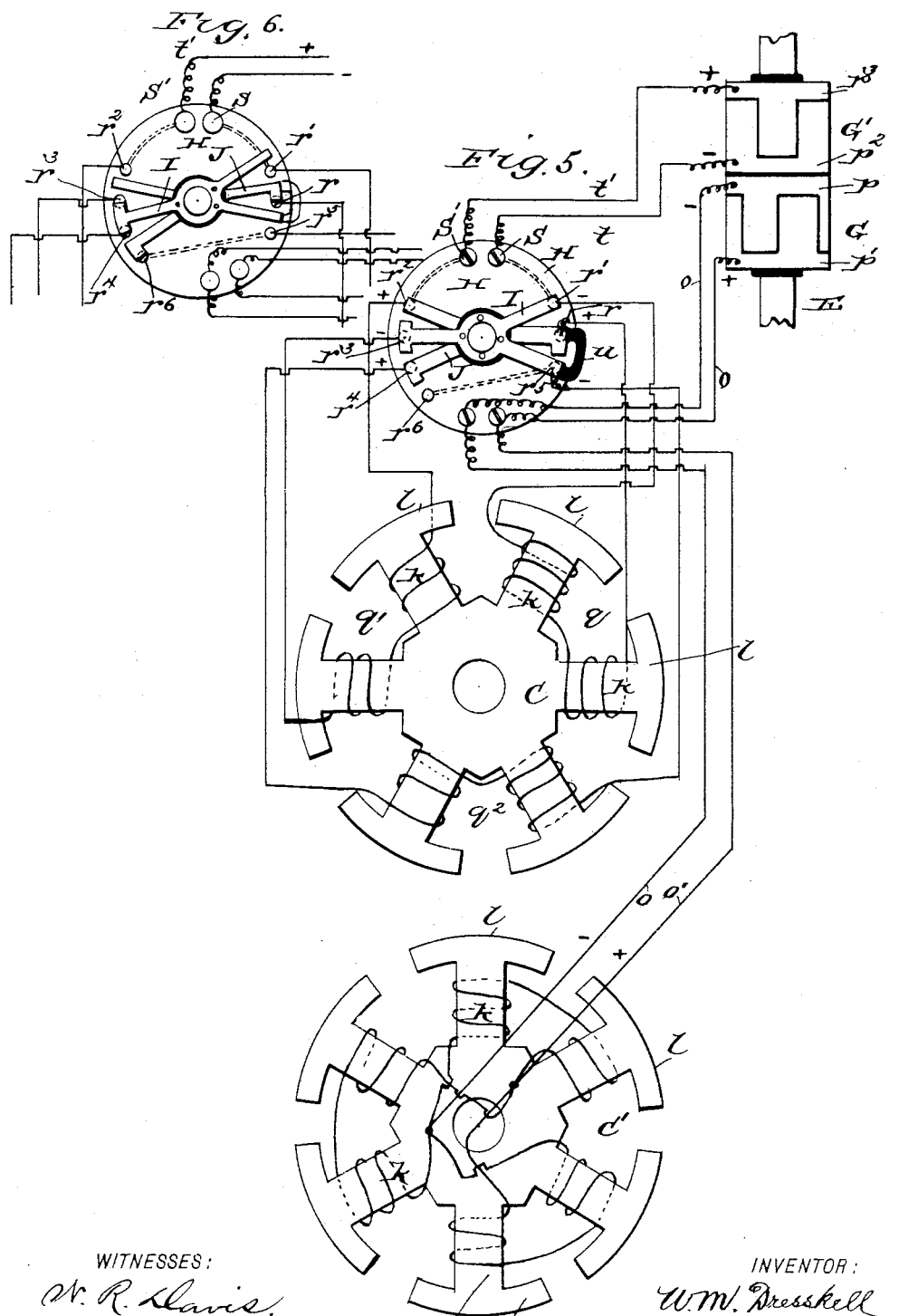
WITNESSES:
N. R. Davis
C. Sedgwick
INVENTOR:
W. M. Dresskell
BY
[signature]
ATTORNEYS

UNITED STATES PATENT OFFICE.

WILLIAM M. DRESSKELL, OF BRAINERD, MINNESOTA.

ELECTRIC MOTOR.

SPECIFICATION forming part of Letters Patent No. 445,499, dated January 27, 1891.

Application filed June 9, 1890. Serial No. 354,339. (No model.)

*To all whom it may concern:*

Be it known that I, WILLIAM M. DRESSKELL, of Brainerd, in the county of Crow Wing and State of Minnesota, have invented a new and Improved Electric Motor, of which the following is a specification, reference being had to the annexed drawings, forming a part thereof, in which—

Figure 1:
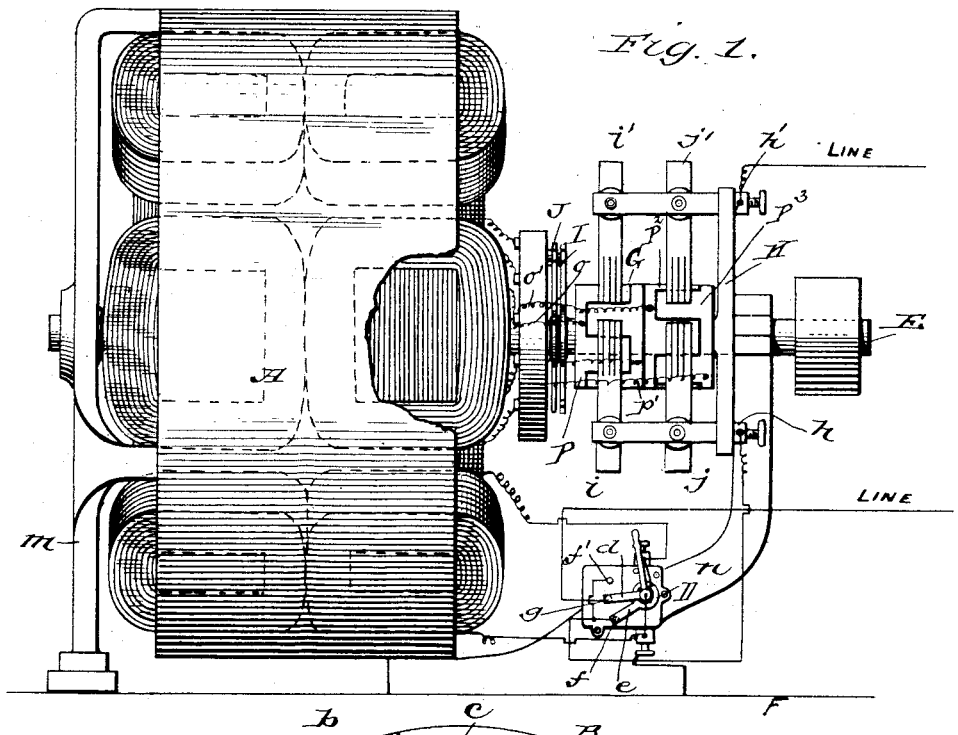
Figure 2:
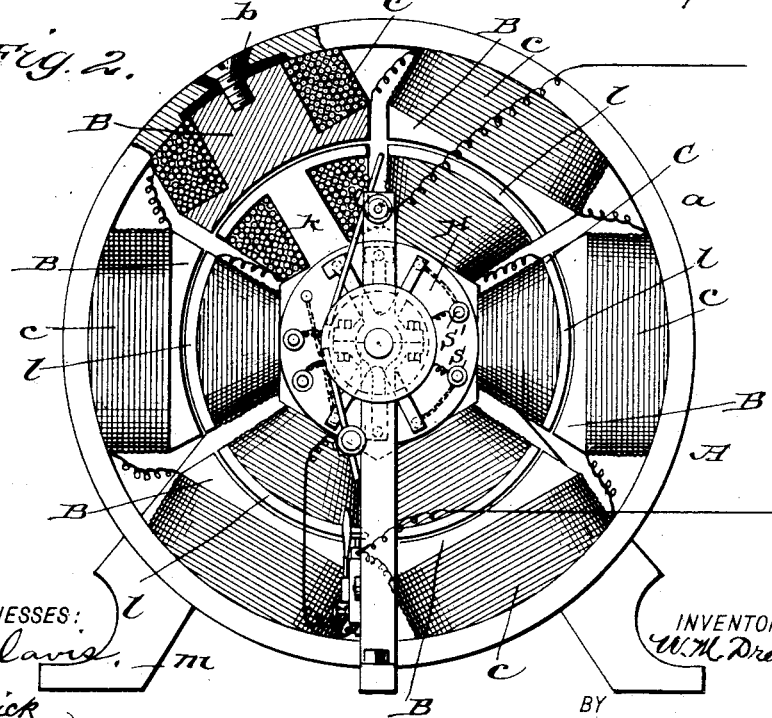
Figure 3:
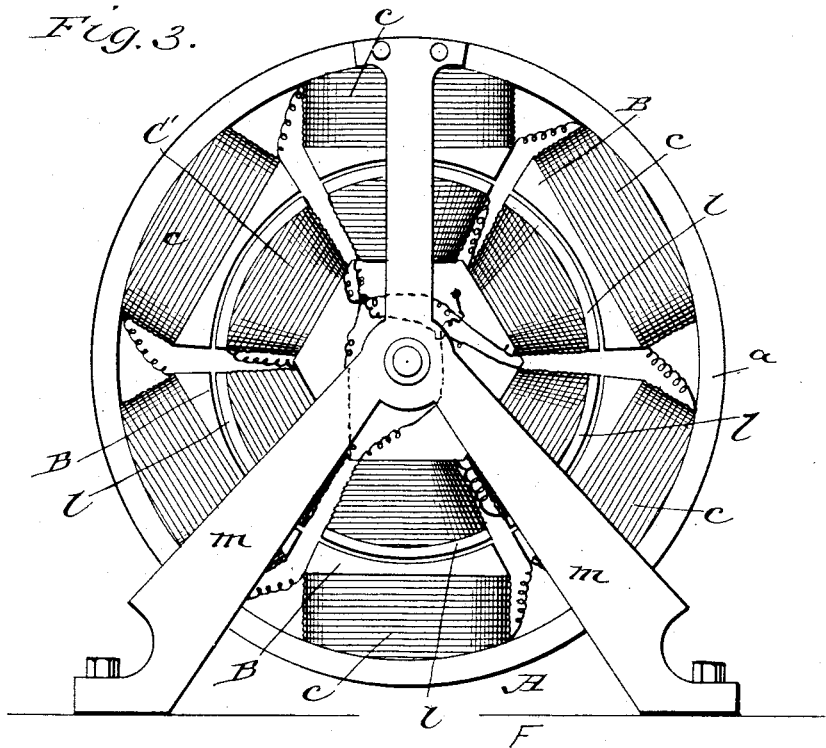
Figure 4:
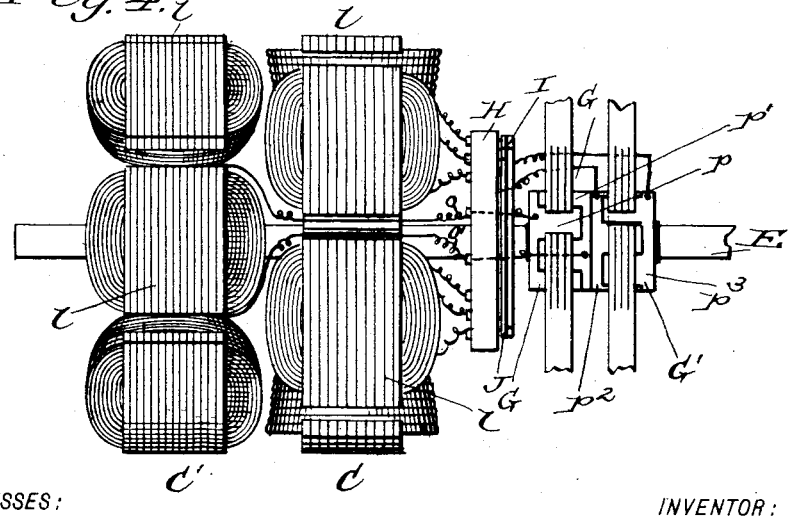

Figure 1 is a side elevation of my improved electric motor. Fig. 2 is a front elevation, partly in section. Fig. 3 is a rear elevation. Fig. 4 is a side elevation of the armature detached from the motor. Fig. 5 is a diagrammatic view showing the connection of the motor when the switch is arranged to place the coils of the armature in parallel, and Fig. 6 is a diagram showing the coils arranged in series.

Similar letters of reference indicate corresponding parts in all the views.

The object of the invention is to provide a motor adapted for direct or alternating currents, and in which the coils of the armature may be connected in series or in parallel to adapt the motor for currents of different strength. In carrying out my invention I adopt the construction and combination of parts hereinafter described.

The field-magnet A is formed of the supporting-rim $a$ and a series of laminated pole-pieces B, secured to the rim $a$, but electrically insulated therefrom by the insulators $b$. The pole-pieces are bored out cylindrically to receive the armatures C C', and upon the pole-pieces, between their inner enlarged extremities, is wound the conductor $c$. The conductors of all of the parts of the field-magnet are connected in series, and the terminals are connected with the arms $d\, e$ of the pole-changing switch D. The switch D is provided with three points $f, f'$, and $g$. The points $f f'$ are connected with the post $h$, which supports the commutator-brushes $i\, j$, while the contact-point $g$ is connected with the line-wire. The armatures C and C' are formed of a laminated core having arms $k$, provided with enlarged polar extremities $l$, and said armatures C C' are mounted upon the shaft E, which is journaled in the spider $m$ and arms $n$, secured to the base F. The poles of the armatures C C' alternate with each other in position, so that the polar extremities of the armature C are opposite the spaces between the polar extremities of the armature C'.

Upon the shaft E are mounted two pole-changing commutators G G'. The arms $k$ of the armature C' are wound in pairs and in opposite directions in each pair, and one set of corresponding terminals of each pair of armature-sections is connected with the wire $o$, which leads directly to the part $p$ of the commutator G. The remaining terminals of the armature are connected by the wire $o'$ with the part $p'$ of the commutator G. The commutators G G' are each formed of two similar halves, each having tongues and notches, the tongues of one half entering the notches of the other half, the two parts being insulated from each other. The entire series of tongues of the two halves corresponds in number with the arms of the armature. The sections of the armature C are wound in a similar way, forming three pairs $q\, q'\, q^2$ of armature-sections, the positive terminal of the section $q$ being connected with the point $r$ of the switch H, and the negative terminal of the same section being connected with the point $r'$ of the switch H. The positive terminal of the section $q'$ is connected with the point $r^2$ of the switch H, and the remaining terminal is connected with the point $r^3$. The positive terminal of the section $q^2$ is connected with the point $r^4$ of the switch H, and the remaining terminal of the said section is connected with the point $r^5$. The point $r^3$ is connected electrically with the point $r^6$, and the point $r'$ is connected electrically with the binding-screw S, which receives the wire $t$, running to the part $p^2$ of the commutator G'. The point $r^2$ is connected electrically with the screw S', which receives the wire $t'$, leading to the part $p^3$ of the commutator G'.

Upon the armature-shaft E are mounted the three-armed switch-arms I J, which are insulated from each other and from the armature-shaft, but which are capable of touching the contact-points $r$ to $r^5$, inclusive. The switch-arms I J are connected by a curved bar $u$ of insulating material, so that both switch-arms may be moved simultaneously.

When the switch is in the position shown in Fig. 5, the current passes from the part $p^3$ of the commutator G' through the wire $t'$, screw S', the point $r^2$, thence through the switch-arm J to the points $r^4$ and $r$ to all of the sections of the armature, returning through the points $r^3$ $r^5$, switch-arm I, point $r'$, screw S, and wire $t$ to the part $p^2$ of the commutator G', thereby passing through all of the sections of the commutator in parallel, the windings being so arranged as to cause the poles to alternate in name around the armature. When the switch-arms I J are moved, as shown in Fig. 6, the current entering through the wire $t'$ and screw S' passes through the point $r^2$ to the armature-section $q'$. Returning to the contact-point $r^3$, it passes through the enlarged end of the arm of the switch-arm I to the point $r^4$, thence through the section $q^2$ to the contact-point $r^5$, thence to the contact-point $r^6$, thence through the switch-arm J through the contact-point $r$ to the armature-section $q$, thence to the contact-point $r'$ and back to the section $p^2$ of the commutator G' through the contact-point $r'$, screw S, and wire $t$, thus throwing all of the coils in series. An arm K, attached to the support $n$ of the armature-shaft E, supports the post $h$ and commutator-brushes $i$ $j$, to which reference has already been made; also, a similar post $h'$, which supports another pair of brushes $i'$ $j'$, the two pairs of brushes bearing upon the same side of the commutators. The current entering the machine by the line-wire is commuted, so that it produces in the armature-poles polarity of different name from the field-magnet poles, which are both approached by the armature-poles, and when the armature-poles are centrally opposite the field-magnet poles the current is reversed and the armature is repelled. This occurs in either a direct or alternating current.

I provide an ordinary current-reversing switch for changing the direction of the current through the machine, thus reversing the direction of the rotation of the armature.

Having thus described my invention, I claim as new and desire to secure by Letters Patent—

In an electric motor, the combination, with the armature-coils, of an insulating-disk carrying series of contact-points connected with the armature-coils, and two three-armed switch-arms placed upon the armature-shaft, insulated from each other and from the shaft, and adapted to change the connections of the armature from series to parallel or the reverse, substantially as specified.

WILLIAM M. DRESSKELL.

Witnesses:
MILTON MCFADDEN,
H. W. BRUCE.